March 5, 1940.  F. J. LEMIEUX  2,192,407
METHOD OF AND JIG FOR OPERATING UPON MONOTYPE MOLDS
Filed May 10, 1938  2 Sheets-Sheet 1
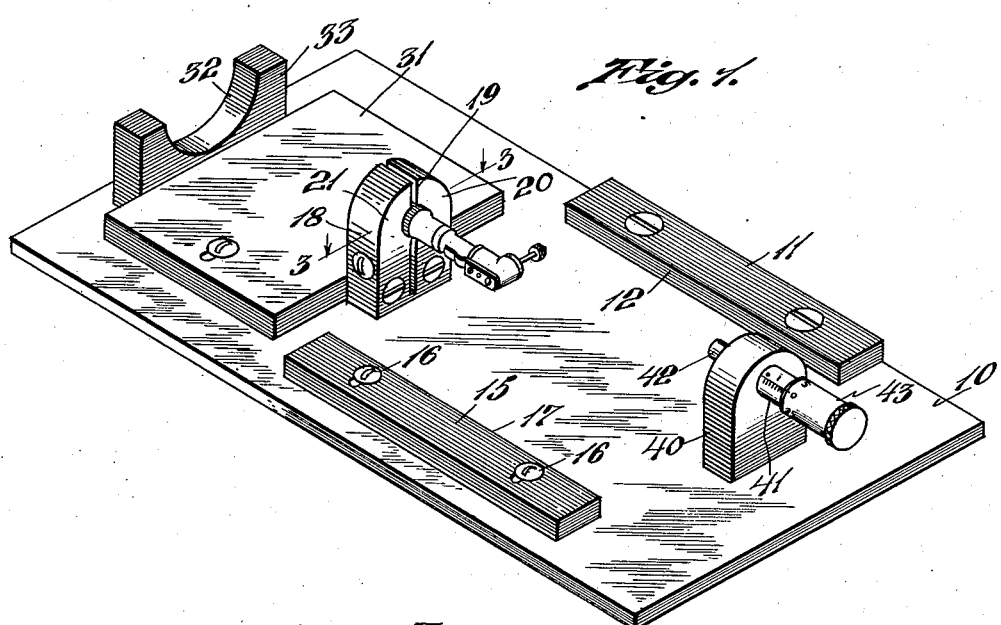
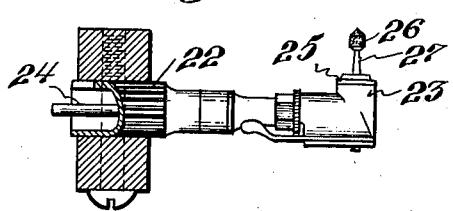
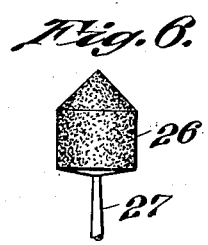
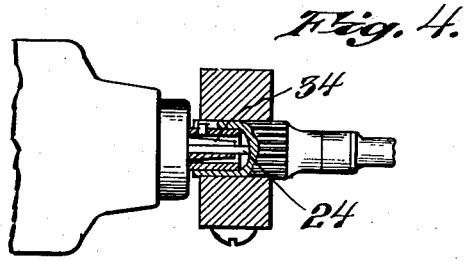
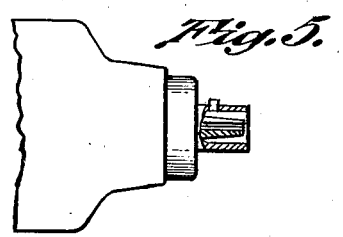
INVENTOR.
Frank J. Lemieux
BY Barlow & Barlow
ATTORNEYS.

March 5, 1940. F. J. LEMIEUX 2,192,407
METHOD OF AND JIG FOR OPERATING UPON MONOTYPE MOLDS
Filed May 10, 1938 2 Sheets-Sheet 2
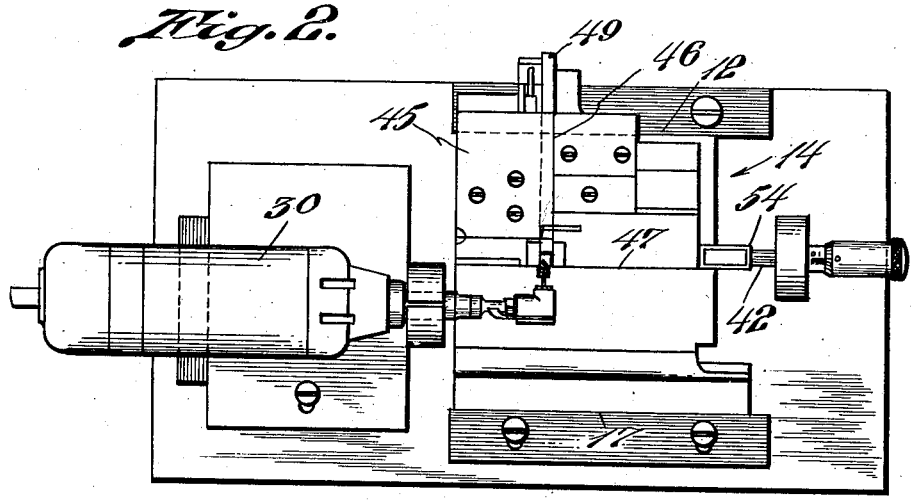
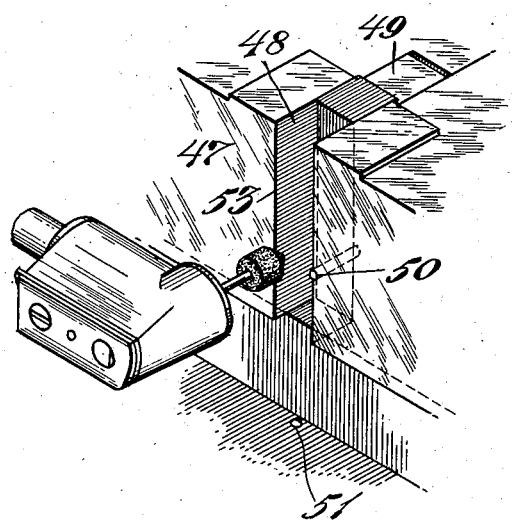
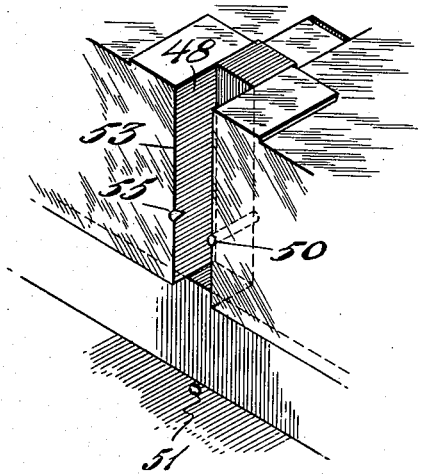
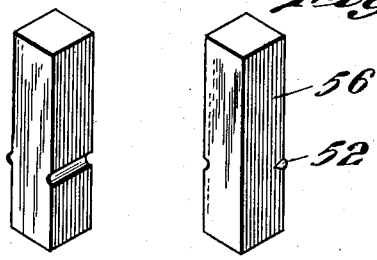
INVENTOR.
Frank J. Lemieux
BY
Barlow & Barlow
ATTORNEYS.

Patented Mar. 5, 1940

2,192,407

UNITED STATES PATENT OFFICE 2,192,407

METHOD OF AND JIG FOR OPERATING UPON MONOTYPE MOLDS

Frank J. Lemieux, Rumford, R. I.

Application May 10, 1938, Serial No. 207,111

3 Claims. (Cl. 51—98)

This invention relates to the art of printing, and particularly to the provision of printing units such as are shown in my co-pending application which matured as Patent No. 2,116,948, dated May 10, 1938.

One of the objects of this invention is to perform the desired operation upon a type casting mold without dissembling the entire mold but by merely moving to certain positions movable parts of the mold without further disrupting the mold assembly.

Another object of the invention is to provide a means whereby a mold may be changed from the form usually now in use to a form for casting Monotype in accordance with the invention of the above said patent.

Another object of the invention is to so operate upon the mold that the removed material will not act as an abrasive to the moving parts of the mold, after the work has been performed.

Another object of the invention is to remove the material in such small amounts and to provide a cutting tool which will absorb the small amounts of material removed so that this material will not be distributed in the sliding surfaces of the ejector plunger or blade of the mold.

A further object of the invention is to so shape the cut made that the type may be readily ejected.

Another object of the invention is to provide a jig by which the above method may be carried out with precision by providing locating means for the mold and means for gauging and governing the position of the mold with reference to the operating tool that the desired cut may be performed in a measured amount.

A further object of the invention is to provide a portable jig for performing this method at the location of the Monotype machine in which the mold is used so that operations may be performed with a minimum cost, inconvenience and loss of time to the printing plant whose mold is being so changed.

With these and other objects in view, the invention consists of certain novel features of construction, as will be more fully described, and particularly pointed out in the appended claims.

In the accompanying drawings:

Fig. 1 is a perspective view of the jig which I use in connection with this invention;

Fig. 2 is a top plan view of this jig showing the portable motor and mold mounted thereon;

Fig. 3 is a sectional view through the tool holder stand on line 3—3 of Fig. 1;

Fig. 4 is a view similar to Fig. 3 but also illustrating a fragmental portion of the motor and its attachment to the tool holder;

Fig. 5 is an elevation partly in section of a fragment of the motor alone;

Fig. 6 is an elevation of the tool alone;

Fig. 7 is a fragmental perspective view illustrating the tool as performing a cut upon a portion of the mold;

Fig. 8 shows the cut after performed on the mold;

Fig. 9 is a perspective view of a unit of type cast after the mold has been changed;

Fig. 10 is a similar view looking at the opposite side of the unit of type.

The mold of a Monotype casting machine is usually considered as a very sensitive part of the machine and for any changes which are to be made it is usually considered that the mold should be returned to the factory as any disturbing of the assembly may result in improper functioning of the mold. My method of operating on the mold, however, is so designed and the jig which I utilize is so arranged that the fixed portions of the mold are not disturbed in any way and the entire operation is performed by reaching in through channels opened up by withdrawing slidable parts of the mold; and the following is a more detailed description of the present embodiment of this invention, illustrating the preferred means by which these advantageous results may be accomplished:

With reference to the drawings, 10 designates a base plate upon which the various parts of my jig are mounted. A guide 11 having an abutting surface 12 against which one edge of the mold, designated generally as 14 in Fig. 2, is fixed on the base, while a companion guide 15 is adjustable by means of screws 16 so as to position its abutting edge 17 a distance from the abutting edge 12 to definitely locate the mold on the base 10 with reference to the cutting tool. These abutting surfaces 12 and 17 are parallel to permit of guided sliding movement of the mold on the base.

A standard 18 is fixedly located on the base and is slit as at 19 to provide resilient portions 20 and 21 for gripping and holding the tool holder 22 removably therein. This tool holder 22 consists of a casing with a right angularly extending supporting portion 23 and with a shaft 24 rotatably mounted in the casing with an angular drive for rotating a clutch 25 which removably holds a tool 26 having a shaft 27 positioned in the clutch. A portable electric motor 30 rests upon a deck 31 and is located in the crotch 32 of a block 33 for suitably holding it in position when its clutch 34 engages the shaft 24 for driving the tool. This motor is electrically driven and of standard construction, the speed being suitable to drive the tool such as at substantially twenty-five thousand revolutions per minute.

The tool 26, although it may be provided with any suitable cutting surface, is illustrated here as of an abrasive material to provide a grinding action upon the mold, and the abrasive material is of such a character as to absorb the fine particles which it grinds from the mold so that the particles will not scatter and will not interfere with the operation of the mold after the cut has been performed. This tool is fixedly mounted with reference to the base and guide 11 and is at such a location as to fit within a channel of the mold.

A standard 40 also secured to the base in which there is mounted a micrometer shell 41 with measuring stud 42 and operating thimble 43. The shell 41 and thimble 43 are suitably graduated so that the relative movement of the end of the stud 42 may be determined. This structure is located at a position to engage some part of the mold and by moving the thimble and in turn the micrometer screw the relative movement of the mold with reference to the cutter may be determined.

The mold 14 which is to be operated upon consists of the usual block-like structure providing a generally solid body 45 which has a channel 46 extending generally parallel to one edge and a channel 47 extending from this first channel and generally parallel to the other edge. The channel 47 provides a guide for the ejecting slider of the mold, which ejecting slider completes the casting cavity 48 when in one position. The channel 46 contains the blade 49 which is withdrawn to cause the cavity 48 to be of the desired setwise thickness for the type. This blade 49 after a casting of the type has occurred in the casting cavity 48 is moved forwardly to force the type into the ejecting channel 47 where the slider moves it from the mold at its next reciprocation. A so-called nick pin 50 is provided in this casting cavity to provide a recess in the cast block of type so that the lower edge of the type may be more readily determined by the printer.

The general body portion of this mold which is of solid block-like structure in an assembled unit in which great precision is required in order to get the parts to be located for proper operation. The casting material enters through the hole 51 in the block to enter the casting cavity.

This mold, as above described, is all of usual structure, and in order to provide a spur or barb 52 on a unit of type, see Fig. 9 or 10, it is necessary that there be some arrangement in the mold for casting this on the type; and in order to do this the mold which I have described is positioned on the base 10 located between the abutments 12 and 17 which receive the mold and guide it positively for sliding movement between these abutments. The ejecting slide which moves in the channel 47 is removed from this channel 47 by merely sliding it therefrom in a simple manner and the blade 49 is withdrawn in its channel 46 a sufficient amount. The tool 26, when the mold is in the jig, may now enter the channel 47 and also to enter the channel 46. The mold is slid in the guides along the abutments 12 and 17 until the tool just engages the corner 53 of the block formed by the channels 46 and 47. The plunger 42 of the micrometer gauge is then brought to just contact the surface 54 of the mold and the measurement is noted. The micrometer is then backed off a quarter of a thousandth, the tool is started in operation, and the mold moved until this quarter thousandth has been cut from the corner 53 of the mold. Then of course the mold will engage the stud 42. Again, a quarter thousandth is backed off on the micrometer and the operation of cutting caused to occur again, and so on until fourteen thousandths of an inch have been removed and a nick or cut 55 is performed in the corner 53. Should the pin 50 occur on the opposite side, the cut would be performed on the opposite corner by moving the gauge in the opposite direction in a similar manner. This cut is performed on a horizontal level or directly opposite the casting cavity 48 from the nick pin 50. Thus, after this cut has been performed the mold may be returned to operation and thereafter blocks of type 56 with a spur 52 thereon will be cast, the mold operating in the same manner as heretofore.

The foregoing description is directed towards the method and construction illustrated, but I desire it to be understood that I reserve the privilege of resorting to all the equivalent changes to which the construction and method are susceptible, the invention being defined and limited only by the terms of the appended claims.

I claim:

1. A jig for operating upon a type casting mold comprising locating means for the mold, a tool holder fixed on the jig and having a definite location relative to said locating means and of a size to extend into the ejecting channel and of a shape to position a tool rotatingly at right angles to said channel, and means to rotate a tool in said holder.

2. A jig for operating upon a type casting mold comprising locating means for the mold, a tool holder fixed on the jig and having a definite location relative to said locating means and of a size to extend into the ejecting channel and of a shape to position a tool rotating at right angles to said channel, means to rotate a tool in said holder, and a gauge fixed on the jig to determine relative movement of the mold and the tool.

3. A jig for operating upon a type casting mold comprising locating means for the mold, a tool holder fixed on the jig and having a definite location relative to said locating means and of a size to extend into the ejecting channel and of a shape to position a tool rotating at right angles to said channel, means to rotate a tool in said holder comprising a portable motor, and a rest fixed on the base of the jig for aligning said motor with said tool holder.

FRANK J. LEMIEUX.